D. BICKFORD.
Clock Pendulum.
No. 19,479.
Patented March 2, 1858.
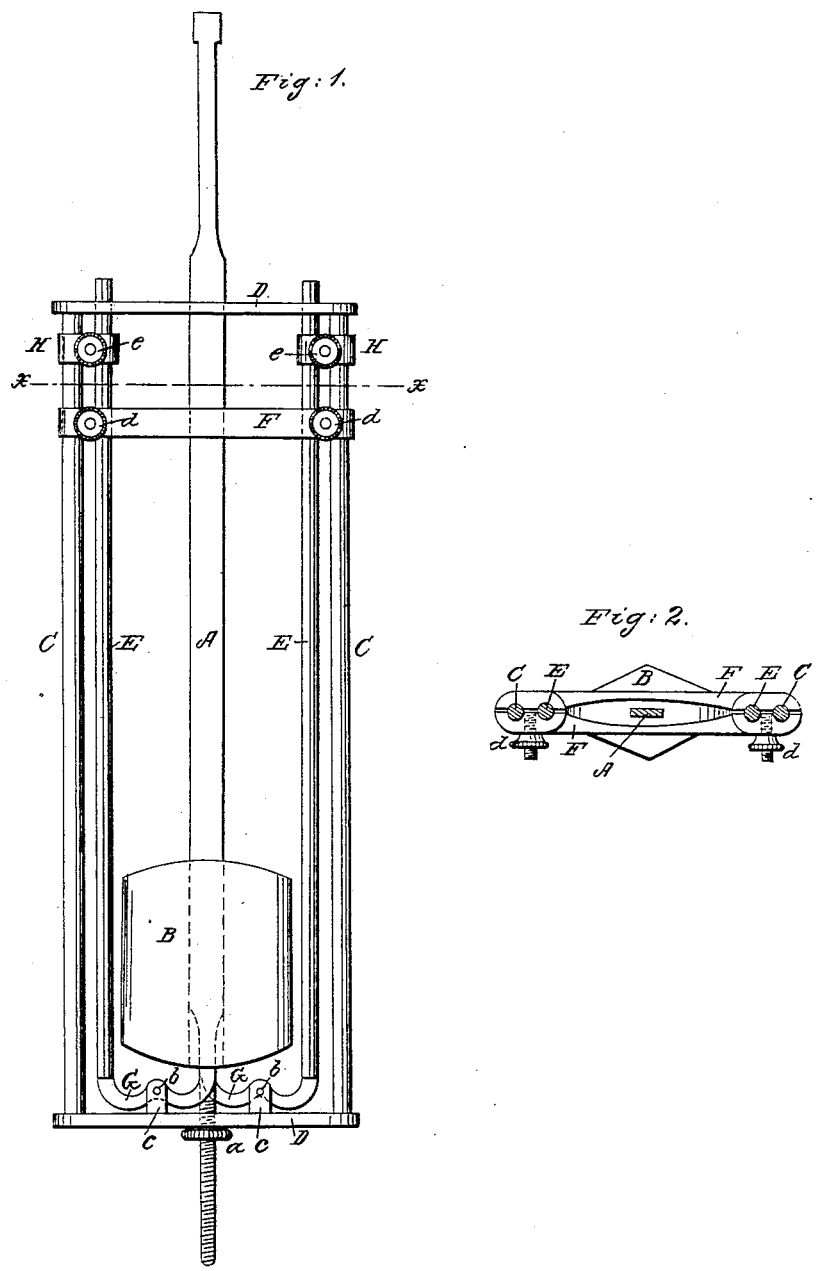

UNITED STATES PATENT OFFICE.

DANA BICKFORD, OF WESTERLY, RHODE ISLAND.

COMPOUND PENDULUM.

Specification of Letters Patent No. 19,479, dated March 2, 1858.

*To all whom it may concern:*

Be it known that I, DANA BICKFORD, of Westerly, in the county of Washington and State of Rhode Island, have invented a new and useful Improvement in Compensating-Pendulums for Clocks; and I do hereby declare that the following is a full, clear, and exact description of the same, reference being had to the accompanying drawings, forming part of this specification, in which—

Figure 1, is a front view of a compensating pendulum constructed according to my invention. Fig. 2, is a horizontal section of the same in the line $x$, $x$, Fig. 1.

Similar letters of reference indicate corresponding parts in both figures.

This invention relates to compensating pendulums of what is known as the "gridiron" construction, and consists in certain means of correcting the compensation.

To enable others skilled in the art to make and use my invention I will proceed to describe its construction and operation.

A, is the main rod of the pendulum, which is of steel and suspended at its upper end.

B, is the bob fitted to slide freely up and down a portion of the said rod.

C C D D, is a frame composed of two parallel steel rods C, C, of equal length connected rigidly at their ends by two steel crosspieces D, D, which are fitted to the rod A, in such a manner as to slide freely up and down thereon, but to keep the rods C, C, parallel with the main rod A, and equidistant therefrom. This frame is supported by a nut $a$, which is fitted to a screw thread on the lower portion of the rod.

E, E, are a pair of brass rods fitted to pass freely through holes in the upper crosspiece, and secured firmly to the two rods C, C, near the upper ends thereof and in positions parallel therewith by means of a pair of double screw clamps F, F, the form of which is best shown in Fig. 2, the said screw clamps being entirely independent of the rod A. The lower ends of these rods E, E, bear upon the ends of two short levers G, G, of the first order which work upon fulcra $b$, $b$, whose bearings $c$, $c$, are attached firmly to the bottom crosspiece D, and the opposite ends of these levers G, G, support the bob B.

The compensation is effected in this pendulum by the differential expansion and contraction of the rods C, C, and D, D. As the rod A, expands by increased temperature it allows the lower crosspiece to descend, but the rods C, C, expanding upward at the same time slide the clamps F, F, up the rod A, and the rods E, E, expanding in a greater degree downward from the clamps F, F, depresses the ends of the levers G, G, upon which they bear, and cause the other ends to be raised and to raise the weight B, on the rod A. A contrary effect is produced when the rod A, contracts. The effective portions of the rods C, C, and D, D, are only those parts below the clamps F, F. The correctness of the compensation to keep the center of oscillation always at the same distance from the point of suspension depends entirely upon the proper relation between the effective lengths of these rods; for the purpose of regulating this, the screw clamp F, is made movable so that it can be moved higher up or lower down the said rods, to give a greater or less range to the bob B. For convenience of adjustment of the clamps F, F, I employ two other pairs of screw clamps H, H, to connect each rod C, with its neighbor E, E, while the clamps F, F, are being moved; and before unscrewing the nuts $d$, $d$, of the latter clamps to adjust them, the nuts $e$, $e$, of the clamps H, H, should be tightened up, and after F, F, have been adjusted and secured again H, should be loosened.

It is proper to state that instead of the clamps F, F, two single pairs of clamps like H, H, may be used but I consider the double pair F, F, to be the best as with them it is easier to adjust the rods of the two sides of the pendulum to a uniform length.

What I claim as my invention and desire to secure by Letters Patent is—

The arrangement and combination, substantially as herein shown and described, of the rods E, levers G, and the bob B, so that by the expansion and contraction of rods E, the position of bob B upon the rod A will be changed, for the purpose set forth.

DANA BICKFORD.

Witnesses:
J. M. PENDLETON,
D. F. STILLMAN.